United States Patent Office 2,961,459
Patented Nov. 22, 1960

2,961,459

GLYCOL PYROBORATES

Clark G. Spike, Royal Oak, Mich., assignor, by mesne assignments, to The Standard Oil Company, Cleveland, Ohio, a corporation of Ohio No Drawing. Filed Apr. 27, 1956, Ser. No. 580,998

4 Claims. (Cl. 260—462)

This invention relates to new compositions of matter and more particularly to new esters of pyroboric acid.

An object of this invention is to provide new compositions of matter. A further object is to provide new esters of boron. A further object is to provide new pyroborate esters. Still another object is to provide new compositions of matter which have great utility in the preparation of valuable boron compounds.

The above and other objects are accomplished by providing new compositions of matter which comprise bis-alkylene pyroborates having the formula

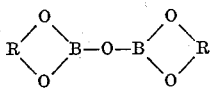

wherein R is an alkylene group containing from 2 to 20 carbon atoms and is from 2 to 6 carbon atoms in length. In other words, these bis-alkylene pyroborates contain a total of from 4 to 40 carbon atoms and possess two alkylene groups which are 2 to 6 carbon atoms in length. These pyroborates are cyclic esters of pyroboric acid (sometimes known as mesoboric acid). This acid has the formula

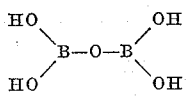

Thus, the new compounds of this invention are esters between one molecule of pyroboric acid and two molecules of dihydroxyalkane or diol containing from 2 to 20 carbon atoms, the two hydroxy groups of which are separated by from 2 to 6 carbon atoms. The carbon atoms separating the hydroxy groups are invariably aliphatic in all my compounds. Such diol can, however, be substituted with other hydrocarbon groups, such as alkyl, cycloalkyl, aralkyl, aryl, and alkaryl provided only aliphatic carbons separate the two hydroxy groups. Generally speaking, the nature of such substituents in the alkane diol is immaterial so long as the total number of carbon atoms in the alkane diol is not greater than about 20. The alkylene groups of the pyroborate esters can also contain one nitrogen atom; iminodiethylene, iminodipropylene, iminodiisopropylene, N-ethyl iminodiethylene, etc., serving as examples. These particular pyroborates are thus formed from two equivalent weights of a diol, such as diethanol amine, dipropanol amine, diisopropanol amine, N-ethyl diethanol amine, etc., per equivalent weight of pyroboric acid.

Preferred compounds of this invention are bis-alkylene pyroborates containing a total of from 6 to 16 carbon atoms wherein each alkylene group is from 2 to 3 carbon atoms in length and is substituted with from 0 to 4 alkyl groups containing from 1 to 2 carbon atoms. These preferred pyroborates are thus bis-alkylene pyroborates having two five- or six-membered rings composed of 2 to 3 carbon atoms, two oxygen atoms and one boron atom. These pyroborates are preferred because of ease of manufacture and because they are especially adapted to use as intermediates for manufacture of valuable boron compounds.

The new compounds of my invention find outstanding utility as chemical intermediates in the preparation of valuable boron compounds. For example, they can be used to smoothly and readily produce glycol boric acids of the formula

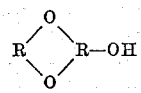

where R has the structure as defined above. These glycol boric acids find utility as fuel additives.

Moreover, the new compounds of this invention find use as intermediates in the preparation of orthoborate esters of the formula

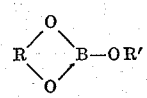

where R has the structure as defined above and R' is an organic group, preferably a $C_1$ to $C_{10}$ alkyl group or a $C_6$ to $C_{10}$ aryl hydrocarbon group. These esters likewise find utility as fuel additives and are highly desirable because of their hydrolytic stability.

Moreover, my compounds can be used to prepare novel boron chelate compounds of the formula

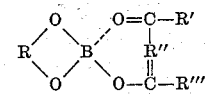

where R has the structure as defined above, R' and R''' are organic radicals, preferably alkyl radicals of 1 to 10 carbon atoms and aryl hydrocarbon radicals of 6 to 10 carbon atoms; and R'' is an alkylene radical of 1 to 10 carbon atoms wherein the alkylene portion of the radical preferably contains 1 to 3 carbon atoms. These compounds are likewise useful and are especially outstanding as fuel additives.

A number of methods are available for the preparation of my new esters. In one method boric oxide ($B_2O_3$) is reacted with the appropriate glycol under conditions whereby water of esterification is removed from the reaction zone as it is formed. This method of preparation is normally conducted at a temperature of about 75 to 150° C. It is desirable but not necessary to use an azeotroping agent to facilitates the removal of water of esterification. Organic hydrocarbons boiling between about 75° C. and 150° C.—benzene, toluene, xylene, etc.—are elegant for this purpose.

Another method for preparing my new compounds comprises reacting an alkyl orthoborate with the appropriate diol under conditions such that the alcohol of condensation is removed from the reaction zone as it is formed. This reaction is normally carried out at a temperature equal to or slightly above the boiling point of the alcohol of condensation that is formed. This facilitates the removal of the alcohol and thus hastens the reaction to completion. Since I preferably use orthoborates ranging from methyl to butyl the reaction temperature normally ranges between about 65° C. to 120° C. at atmospheric pressure. Correspondingly higher or lower temperatures are used if the reaction is carried out under reduced or elevated pressure. A diluent such as an aliphatic diketone, an aromatic hydrocarbon, etc. can be used to facilitate reaction. However, good results are obtained without the use of a diluent.

A third method for the preparation of my new compounds comprises reacting metaboric acid with the appropriate diol under conditions such that the water of esterification is removed from the reaction zone as it is formed. It is important that the reactant ratios be such that there is substantially a 1 to 1 ratio of boron atoms to diol molecules in the initial reaction mixture. In other words, there should be one mole of diol present for every mole of monomeric metaboric acid present. In this embodiment, which is normally carried out at a temperature of 75 to 150° C., it is convenient to use an entraining agent such as an aromatic hydrocarbon boiling in the range of 75 to 150° C. to facilitate removal of said water.

It will be seen that the above methods of preparation generically comprise reaction of a diol with an oxide, acid, or ortho ester of boron under conditions such that the molecule of condensation between the reactants is removed from the reaction zone as it is formed.

The diol which is used as a reactant to make my compounds is an aliphatic diol containing 2 to 20 carbon atoms in which 2 to 6 carbon atoms separate the two hydroxy groups. Thus, the diols can vary from ethylene glycol to hexylene glycols wherein the alkylene is substituted with hydrocarbon radicals up to a total of 14 carbons; e.g. 1,6-diheptylhexane diol. The diol reactant is preferably one of 6 to 16 carbon atoms wherein the hydroxyl groups are separated from 2 to 3 carbon-atom alkylene groups and the alkylene groups in turn are substituted with 0 to 4 alkyl groups containing 1 to 2 carbon atoms. It will be seen that the preferred diols range from ethylene glycol to propylene glycols substituted with hydrocarbon groups totaling 8 carbon atoms; e.g. 3,4-diethyl-3,5-heptylene glycol.

Preparation of compounds of this invention is illustrated by the following examples.

*Example I*

Boron oxide was prepared by dehydrating orthoboric acid (62 parts) by heating for 12 hours at 160° C. at a pressure of 1 millimeter of mercury. The dehydration reactor was equipped with a vapor take-off line to which was fitted a water trap. Twenty-five parts of water were collected in the water trap during the dehydration process. Upon completion of the dehydration, 118 parts of 2-methyl-2,4-pentane diol was added to the reactor under dry nitrogen atmosphere. The reactor was provided with reflux means and the reaction mixture was heated to a temperature of 145° C. at atmospheric pressure until a total of 18.5 parts of water was removed.

The remaining reaction mixture was then distilled at reduced pressure and a total of 91.7 parts of bis(2-methyl-2,4-pentane diol)pyroborate having the formula

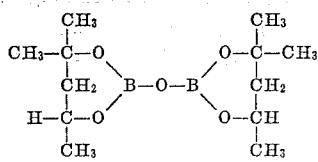

was collected as a fraction boiling at 110–127° C. at a pressure of 1 to 2 millimeters of mercury.

*Example II*

The procedure of Example I is repeated using ethylene glycol as the diol. A good yield of bis(ethylene glycol)-pyroborate is obtained.

*Example III*

A mixture of 876 parts of triethylborate and 712 parts of 2-methyl-2,4-pentanediol was heated to boiling at atmospheric pressure in a reactor with vapor take-off means to which a take-off condenser was connected. Five hundred eighty parts of ethanol was removed as vapor by this procedure.

To the residue after cooling was added 600 parts of acetylacetone and boiling was continued to further remove ethanol. Over a period of 32 hours' heating, a total of 261 additional parts of ethanol were obtained as overhead take-off. Between the eighth and sixteenth hours of the above heating period an additional 200 parts of acetylacetone was added to the reaction mixture.

The reaction mixture was then distilled at reduced pressure of 2 to 30 millimeters of mercury to remove acetylacetone. A total of 600 parts of a mixture of acetylacetone and a boron-containing material were removed in this manner. The pressure was then reduced to 0.1 to 0.7 millimeter of mercury and in this manner 334.6 parts of bis(2-methyl-2,4-pentanediol)pyroborate boiling at 84.97° C. was obtained.

A portion of the pyroborate product was treated with mannitol and titrated potentiometrically with standard sodium hydroxide solution. The equivalent weight of the compound as determined by this method was 139 (calculated 135) and the percent boron found by this method was 7.8 (calculated 8.0).

*Example IV*

Using the procedure of Example III except that the acetylacetone diluent is omitted, bis(hexylene glycol)-pyroborate is prepared in good yield by reaction of tri-isopropylborate and 1,6-hexanediol.

*Example V*

Two hundred parts of toluene and 61.8 parts of boric acid, H₃BO₃, were added to a reaction vessel equipped with heating means, stirring means and a vapor take-off device to which was connected a water trap. The vessel was then heated with stirring to the boiling point of the toluene-water azeotrope. Heating and agitation were continued until an amount of the azeotrope corresponding to 18 parts of water had been removed from the reaction mass. The vessel which contained a solution of metaboric acid, HOBO, in toluene, was then cooled.

To this toluene-metaboric acid solution containing 43.8 parts of HOBO, was added 118.2 parts of 2-methyl-2,4-pentanediol. The resulting mixture was again heated with stirring to the boiling temperature of the toluene-water azeotrope until an amount of azeotrope corresponding to 27 parts of water had been removed from the reaction mass. The remaining toluene was removed by distillation at atmospheric pressure leaving bis(2-methyl-2,4-pentanediol)pyroborate as a water-white liquid having a boiling point of 114 to 115° C. at from 1.5 to 2 millimeters of mercury. The molecular weight of this product was determined to be 267 and on analysis the product was found to have 54.6 percent carbon, 9.2 percent hydrogen and 8.12 percent boron. This corresponds to a calculated analysis of 53.5 percent carbon, 8.96 percent hydrogen and 8.02 percent boron and a calculated molecular weight of 269.95.

*Example VI*

Two hundred parts of toluene and 61.8 parts of boric acid were converted to metaboric acid as described in Example V and 76 parts of propylene glycol were added to the toluene metaboric acid solution and reacted according to the procedure of Example V. The reaction was discontinued after an amount of toluene-water azeotrope corresponding to 27 parts of water had been removed from the reaction vessel. On removing the toluene by atmospheric distillation, 143 parts of bis-propylene pyroborate, a water-white liquid, remained in the reaction vessel.

*Example VII*

The procedure of Example VI is followed except that 118 parts of 1,6-hexanediol are reacted with metaboric acid in lieu of propylene glycol, to prepare bis(1,6-hexylene)pyroborate.

*Example VIII*

Following the procedure of Example V, 104.1 parts of pentanediol-1,5 is reacted with 43.8 parts of metaboric acid to prepare bis(1,5-pentylene)pyroborate.

*Example IX*

A solution of metaboric acid and toluene was prepared from 61.8 parts of boric acid and 215 parts of xylene according to the procedure in Example V. To this solution is added 62 parts of ethylene glycol and the mixture is heated until an amount of xylene-water azeotrope, amounting to 27 parts of water, is removed. Atmospheric distillation of the remaining xylene enables recovery of a good yield of bis-ethylene pyroborate.

*Example X*

Bis(6-n-propylnonenyl-1,4)pyroborate is prepared by first refluxing 610 parts of boric acid with 259 parts of dioxane until dioxane-water azeotrope containing 18 parts of water has been removed. Two-hundred and two parts of 6-(n-propyl)nonanediol-1,4 is then added to the reaction vessel and azeotroped until an amount of dioxane-water azeotrope corresponding to 27 parts of water has been removed. The dioxane is removed from the resulting bis(6-n-propylnonenyl-1,4)pyroborate by distillation.

*Example XI*

Metaboric acid is prepared according to the procedure of Example V by heating 357 parts of cyclohexane and 61.8 parts of boric acid under reflux conditions until cyclohexane azeotrope containing 18 parts of water are removed from the reaction vessel. Three-hundred fourteen and five tenths parts of 1,2-eicosanediol are then added to the meta boric acid-cyclohexane solution and the mixture is heated with stirring under reflux conditions until an amount of cyclohexene azeotrope corresponding to 27 parts of water is removed. The excess cyclohexane is removed from the resulting bis(1,2-eicosylene)pyroborate.

One utility of the compound of my invention is in the preparation of certain boron-containing chelate compounds. In general, I can react my pyroborates with organic chelating agents having electron donating groups arranged such that a five- or six-membered ring which contains boron, carbon and the electron donating atoms is formed. Examples of such chelating agents include α- and β-diketones, α- and β-keto esters, α- and β-alkanol amines, etc. In general, the preferred electron donating atoms are nitrogen and oxygen. The reaction of my pyroborates with the chelating agents is carried out by mixing the pyroborate with the chelating agent and heating at a temperature sufficiently high so that the water formed in the reaction is removed as the reaction proceeds. Generally, it is desirable to use temperatures of about 75 to 150° C. with pressure varying from about 1 millimeter of mercury to about one atmosphere. It is desirable but not necessary to use an azeotroping agent—preferably an aromatic hydrocarbon boiling at 75 to 150° C. such as benzene, toluene, ethyl benzene, and the like—to facilitate water removal. An illustration of this utility is shown in Example XII.

*Example XII*

To the pyroborate prepared in Example I (27 parts) was added 20 parts of acetylacetone in a reactor equipped with heating means and a reflux condenser. The reaction mixture was heated to reflux (156–171° C.) at atmospheric pressure until a total of 10 parts of by-product material including water was taken off through the reflux condenser. The mixture was then further heated at a pressure of 88 millimeters of mercury at 115° C. until a further 6 parts of by-product including water had passed through the reflux condenser. Finally, the reaction mixture was heated at 99–103° C. at 1 millimeter pressure whereupon 24.4 parts of 2-methyl-2,4-pentenyl acetylacetonyl orthoborate having the formula

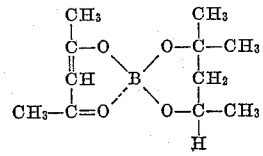

was obtained as overhead product. This material was obtained as a yellow liquid which is soluble in gasoline and is subject only to very slow hydrolysis. On analysis it was found to have a boron content of 4.5 percent (calculated value 4.8 percent). Purification by conventional means clarifies this product to a light-colored material.

Another utility of my pyroborate esters is their use in making orthoborate esters wherein two of the hydroxyl groups of orthoboric acid are esterified with a diol molecule of the type described above, and the third hydroxyl group of the orthoboric acid is esterified with a monohydric alcohol or phenol.

In carrying out this reaction the pyroborate is reacted with the appropriate alcohol or phenol at a temperature high enough so that the water of reaction is removed as the reaction proceeds. In general, temperatures range from about 75 to 150° C. Reaction is facilitated by use of an azeotroping or entraining agent to hasten the removal of water. Suitable entraining agents include those mentioned above.

For this use of my pyroborates, alcohols and phenols in general are suitable although I ordinarily prefer aliphatic alcohols of 1 to 10 carbon atoms (methanol, ethanol, propanol, isopropanol, the butanols, the amyl alcohols, decyl alcohols, and the like); cycloaliphatic alcohols of 5 to 6 carbon atoms (cyclopentanol, 3-methyl cyclopentanol, cyclohexanol, and the like); and phenols of 6 to 10 carbon atoms (phenol, orthocresol, 2,4-diethyl phenol, and the like). This utility is illustrated by Example XIII.

*Example XIII*

To the pyroborate prepared in Example III was added 2,4-dimethyl-3-pentanol. The mixture was refluxed for one hour and then fractionally distilled using a Vigreux column. After removal of excess 2,4-dimethyl-3-pentanol and water of reaction at atmospheric pressure, the pressure was reduced to 10 millimeters and a fraction boiling at 127–132° C. at this pressure was taken off and collected. This fraction, 2,4-dimethyl-3-pentyl 2-methyl-2,4-pentanediol ester of orthoboric acid having the formula

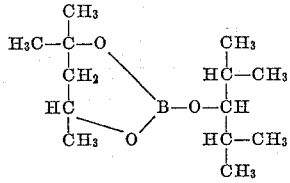

was titrated according to the procedure of Example II. The equivalent weight by this method was found to be 248 (theoretical 244) and the percent boron 4.36 percent (theoretical 4.43 percent). Further analysis by this compound by the same means gave a boron content of 4.30 percent.

A further utility of my pyroborates is their use to prepare glycol orthoboric acids. This reaction is carried out by reacting the pyroborates with water either in liquid form or as a vapor diluted with air, nitrogen or the like. The temperature of reaction is not critical. I have found that temperatures of 0 to 100° C. are quite suitable. This utility is illustrated by Example XIV.

*Example XIV*

A portion of the pyroborate prepared in Example III was subjected to the action of moist air whereupon 2-methyl-2,4-pentanediol boric acid having the formula

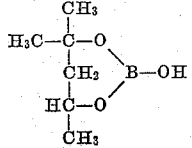

was formed. This material is a crystalline solid product. These crystals were washed with ether and then titrated in the same manner as in Example II. The equivalent weight was found to be 145 and the percent of boron on this basis 7.47 (the calculated values are 144 and 7.52 respectively). The melting point of the compound is 75° C.

The esters of this invention used in the above description and examples are illustrative only. Further examples of my valuable new esters include bis(1,2-propylene)pyroborate,
bis(1,3-propylene)pyroborate,
bis(1,2-butylene)pyroborate,
bis(1,3-butylene)pyroborate,
bis(1,4-butylene)pyroborate,
bis(1,2-hexylene)pyroborate,
bis(1,6-hexylene)pyroborate,
bis(3-methyl-1,5-hexylene)pyroborate,
bis(1,2-diethylethylene)pyroborate,
bis(2,5-diphenyl-1,6-hexylene)pyroborate,
bis(1,6-dimethyl-1,6-phenyl-1,6-hexylene)pyroborate,
bis(1,2,2,3-tetramethyl-1,3-propylene)pyroborate, and the like.

In addition to the diols used above I also can use other diols containing 2 to 20 carbon atoms in which 2 to 6 carbon atoms separate the two hydroxy groups. The diol reactant is preferably one of 1 to 16 carbon atoms wherein the hydroxyl groups are separated from 2 to 3 carbon-atom alkylene groups and the alkylene groups in turn are substituted with 0 to 4 alkyl groups containing 1 to 2 carbon atoms. Typical examples include 1,2-propylene glycol,
1,3-propylene glycol,
1,2-butylene glycol,
1,3-butylene glycol,
1,4-butylene glycol,
1,5-pentylene glycol,
1,4-eicosane glycol,
1,3-dimethyl-2-ethyl-1-propylene glycol and the like.

I claim:
1. As new compositions of matter, bis-alkylene pyroborate having the formula

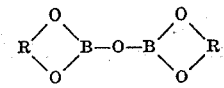

wherein R is an alkylene group of 2 to 6 carbon atoms in length and containing a total of 2 to 20 carbon atoms.

2. The composition of claim 1 wherein R is an alkylene group of 2 to 3 carbon atoms in length and is substituted with 0 to 4 alkyl groups of 1 to 2 carbon atoms.

3. Bis-(2-methyl-2,4-pentanediol)pyroborate.

4. A compound having the following formula

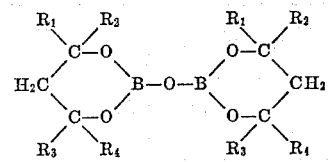

wherein $R_1$, $R_2$, $R_3$ and $R_4$ are selected from the group consisting of hydrogen and methyl not more than one pair of radicals $R_1$ and $R_2$ which are attached to the same carbon atom being hydrogen and not more than one pair of radicals $R_3$ and $R_4$ which are attached to the same carbon atoms being hydrogen.

References Cited in the file of this patent
UNITED STATES PATENTS 2,767,069    Fay et al. _____ Oct. 16, 1956

OTHER REFERENCES

Hermans: "Zeitschrift für Anorganische Chemie," vol. 142, pages 103–4 (1925).

Rippere et al.: "J. Phys. Chem.," vol. 47, pages 204–34 (1943).

"The Van Nostrand Chemist's Dictionary," D. Van Nostrand Co., Inc., New York (1953), page 6.